(12) United States Patent
Uchida (10) Patent No.: US 11,163,511 B2
(45) Date of Patent: Nov. 2, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Takahiro Uchida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/022,115

(22) Filed: Sep. 16, 2020

(65) Prior Publication Data

US 2021/0224008 A1  Jul. 22, 2021

(30) Foreign Application Priority Data

Jan. 16, 2020 (JP) .............................. JP2020-005454

(51) Int. Cl.
*G06F 3/12* (2006.01)
*H04N 1/00* (2006.01)

(52) U.S. Cl.
CPC .......... *G06F 3/1265* (2013.01); *G06F 3/1204* (2013.01); *G06F 3/1244* (2013.01); *H04N 1/00424* (2013.01)

(58) Field of Classification Search
None
See application file for complete search history.

(56) References Cited

U.S. PATENT DOCUMENTS

| 8,108,644 | B2 | 1/2012 | Innan et al. |
| 2006/0215911 | A1* | 9/2006 | Ashikaga ................ G06F 16/93 382/190 |
| 2019/0179876 | A1* | 6/2019 | Zhang .................... G06F 40/106 |
| 2019/0294652 | A1* | 9/2019 | Kang .................... G06F 16/583 |

FOREIGN PATENT DOCUMENTS

| JP | 2009116809 | 5/2009 |
| JP | 5446086 | 3/2014 |

* cited by examiner

*Primary Examiner* — Frantz Bataille
(74) *Attorney, Agent, or Firm* — JCIPRNET (57) ABSTRACT

An information processing apparatus includes a processor configured to extract an annotated page and one or more associated pages associated with the annotated page from target data including plural pages.

20 Claims, 9 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-005454 filed Jan. 16, 2020.

BACKGROUND

Technical Field

The present disclosure relates to an information processing apparatus and a non-transitory computer readable medium.

Related Art

Japanese Patent No. 5446086, for example, describes a document processing program that prepares print data to be printed at a time by arranging: an original document in which additional information has been eliminated from each page of a document including the additional information correlated by specifying positions with respect to pages; and pages with the additional information. The document processing program causes a computer to execute: a first step of receiving first designation that designates the manner of printing of the original document in which the additional information has been eliminated from each page of the document including the additional information correlated by specifying positions with respect to pages; a second step of receiving second designation that designates the manner of printing of the page with the additional information to which the additional information on the document is attached; a third step of determining the arrangement of a printed matter according to the first designation for the original document and a printed matter according to the second designation for the pages with the additional information; a fourth step of computing a scaling factor that allows a printed image of the pages with the additional information to be fitted in a print range determined in accordance with the second designation; and a fifth step of preparing print data that cause a printer to print a printed matter in which the printed matter according to the second designation for the pages with the additional information which has been scaled in accordance with the scaling factor and the printed matter for the original document according to the first designation are arranged as determined in the third step. If the second designation designates printing of N (N is two or more) pages on one surface of printing paper, the fifth step prepares print data such that, when the number of consecutive pages with the additional information is smaller than the number of pages to be printed on one printing paper, a page with a predetermined number or more of pieces of the additional information attached per page is preferentially independently printed on one surface of the printing paper.

SUMMARY

In some cases, only a page with an annotation is extracted as a print target from target data including a plurality of pages, for example. In such cases, a content associated with the page with the annotation is not extracted, and therefore it is difficult to check the content of the page.

Aspects of non-limiting embodiments of the present disclosure relate to providing an information processing apparatus and a non-transitory computer readable medium that allow extraction of a content associated with a page with an annotation, compared to the case where only a page with an annotation is extracted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to extract an annotated page and one or more associated pages associated with the annotated page from target data including a plurality of pages.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail below with reference to the drawings.

Figure 1:
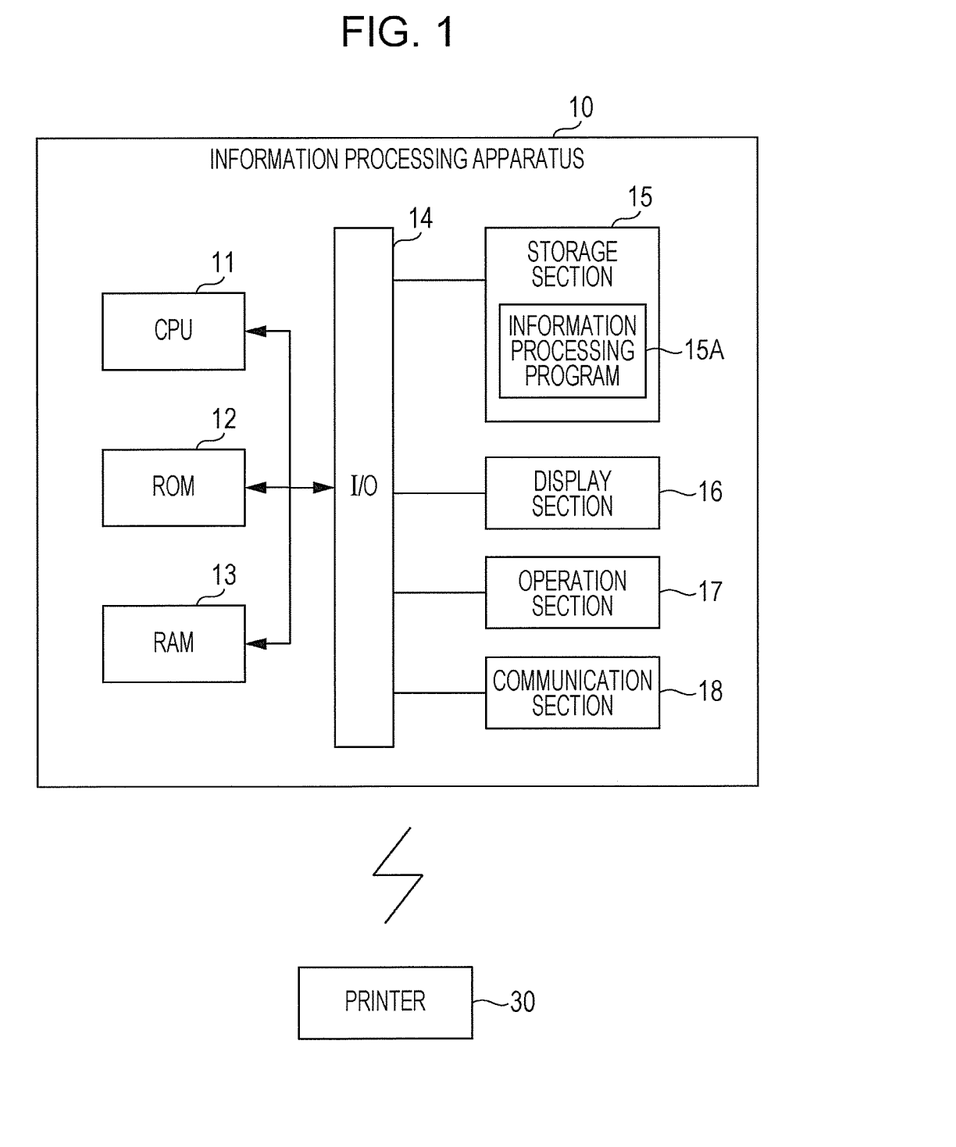
FIG. 1 is a block diagram illustrating an example of the electrical configuration of an information processing apparatus according to an exemplary embodiment.

FIG. 1 is a block diagram illustrating an example of the electrical configuration of an information processing apparatus 10 according to the present exemplary embodiment.

As illustrated in FIG. 1, the information processing apparatus 10 according to the present exemplary embodiment is communicably connected to a printer 30. The information processing apparatus 10 includes a central processing unit (CPU) 11, a read only memory (ROM) 12, a random access memory (RAM) 13, an input/output interface (I/O) 14, a storage section 15, a display section 16, an operation section 17, and a communication section 18.

Examples of the information processing apparatus 10 according to the present exemplary embodiment include a general-purpose computer device such as a server computer and a personal computer (PC). The information processing apparatus 10 may also be a portable terminal device such as a smartphone and a tablet terminal.

The CPU 11, the ROM 12, the RAM 13, and the I/O 14 are connected to each other via a bus. Various functional sections including the storage section 15, the display section 16, the operation section 17, and the communication section 18 are connected to the I/O 14. The various functional sections are communicable with the CPU 11 via the I/O 14.

The CPU 11, the ROM 12, the RAM 13, and the I/O 14 constitute a control section. The control section may be constituted as a sub control section that controls operation of a part of the information processing apparatus 10, or may be constituted as a principal control section that controls operation of the entire information processing apparatus 10. An integrated circuit such as a large scale integration (LSI) or an integrated circuit (IC) chip set, for example, is used for some or all of the blocks of the control section. Individual circuits may be used for the blocks, or partly or entirely integrated circuits may be used as well. The blocks may be provided integrally with each other, or some of the blocks may be provided separately. A part of each of the blocks may be provided separately. Not only the LSI but also a dedicated circuit or a general-purpose processor may be used for the integration of the control section.

Examples of the storage section 15 include a hard disk drive (HDD), a solid state drive (SSD), and a flash memory. The storage section 15 stores an information processing program 15A according to the present exemplary embodiment. The information processing program 15A may be stored in the ROM 12. The information processing program 15A may be application software for document management, by way of example.

The information processing program 15A may be installed in advance in the information processing apparatus 10, for example. The information processing program 15A may be stored in a non-volatile storage medium, or distributed via a network, to be installed, as appropriate, in the information processing apparatus 10 to be implemented. Examples of the non-volatile storage medium are assumed to include a Compact Disc Read Only Memory (CD-ROM), a magneto-optical disk, an HDD, a Digital Versatile Disc Read Only Memory (DVD-ROM), a flash memory, and a memory card.

Examples of the display section 16 include a liquid crystal display (LCD) and an organic electro luminescence (EL) display. The display section 16 may integrally include a touch screen. Examples of the operation section 17 include a device for operation input such as a keyboard and a mouse, for example. The display section 16 and the operation section 17 receive various types of instructions from the user of the information processing apparatus 10. The display section 16 displays various types of information such as the result of a process executed in accordance with an instruction received from the user and a notification about the process.

The communication section 18 is connected to a network such as the Internet, a Local Area Network (LAN), and a Wide Area Network (WAN), and is communicable with the printer 30 via the network.

In some cases, as discussed above, only a page with an annotation is extracted as a print target from target data including a plurality of pages, for example. In such cases, a content associated with the page with the annotation is not extracted, and therefore it is difficult to check the content of the page. The target data may be document data, image data, or data containing a document and an image. The annotation means the function of an electronic annotation that may be attached to the target data. Examples of the annotation include an electronic note and an electronic comment.

Figure 2:
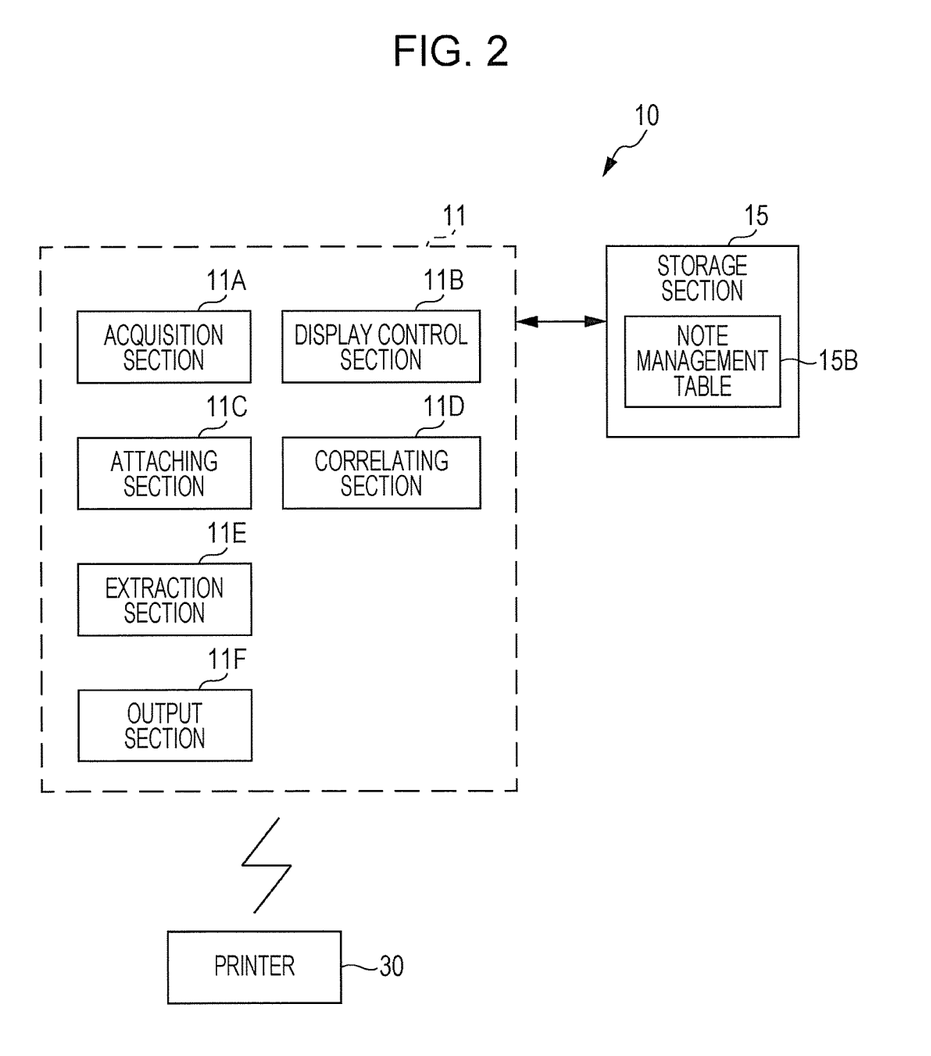
FIG. 2 is a block diagram illustrating an example of the functional configuration of an information processing apparatus according to the exemplary embodiment.

The CPU 11 of the information processing apparatus 10 according to the present exemplary embodiment functions as various sections illustrated in FIG. 2 by writing the information processing program 15A, which is stored in the storage section 15, into the RAM 13 to be executed.

In the present exemplary embodiment, an electronic note is attached to a desired page of the target data as an example of the annotation. However, the annotation is not limited to an electronic note, and may be an electronic comment, for example.

FIG. 2 is a block diagram illustrating an example of the functional configuration of the information processing apparatus 10 according to the present exemplary embodiment.

As illustrated in FIG. 2, the CPU 11 of the information processing apparatus 10 according to the present exemplary embodiment functions as an acquisition section 11A, a display control section 11B, an attaching section 11C, a correlating section 11D, an extraction section 11E, and an output section 11F.

Figure 3:
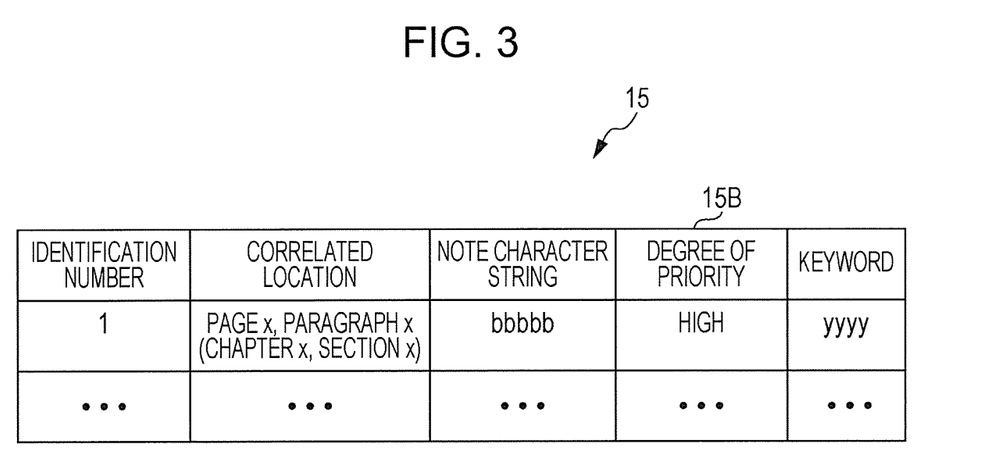
FIG. 3 illustrates an example of a note management table according to the exemplary embodiment.

The storage section 15 according to the present exemplary embodiment stores a note management table 15B illustrated in FIG. 3, by way of example.

FIG. 3 illustrates an example of the note management table 15B according to the exemplary embodiment.

In the note management table 15B illustrated in FIG. 3, a correlated location, a note character string, a degree of priority, and a keyword are registered for each electronic note attached to the target data as correlated with the identification number of the electronic note. The note management table 15B is a data table to be referenced when extracting a page with an electronic note and associated pages.

Specifically, the identification number indicates a unique number that identifies an electronic note attached to the target data. The correlated location indicates a page and a partitioned unit with which the electronic note is correlated. The page is a page with the electronic note, among a plurality of pages included in the target data. The partitioned unit is at least one of a chapter, a section, and a paragraph included in the target data, by way of example. The note character string indicates a character string written in the electronic note. The note character string may be set as appropriate by the user, and is left blank if not set. The degree of priority indicates a degree of priority set to the electronic note. The degree of priority may be set as appropriate by the user to one of a plurality of steps, that is, high, medium, and low, by way of example, and is left blank if not set. The degree of priority and the note character string are examples of an attribute that may be set in advance to an electronic note. The keyword is set to a character string extracted in accordance with a condition determined in advance from a partitioned unit with which the electronic note is correlated. Examples of the condition determined in advance include a "character string that appears the most in the partitioned unit".

The acquisition section 11A according to the present exemplary embodiment acquires target data with no electronic note attached thereto. The target data include a plurality of pages.

The display control section 11B according to the present exemplary embodiment performs control so as to display the target data which are acquired by the acquisition section 11A on the display section 16.

The attaching section 11C according to the present exemplary embodiment attaches an electronic note to a desired page of the target data which are displayed on the display section 16 in accordance with an operation input by the user. The attaching section 11C also receives an input of an attribute (such as a degree of priority and a note character string, for example) of the electronic note.

The correlating section 11D according to the present exemplary embodiment correlates an electronic note with a page and a partitioned unit to which the electronic note is attached by the attaching section 11C, and stores the target data to which the electronic note is attached (hereinafter referred to as "note-attached target data") in the storage section 15. Specifically, the correlating section 11D correlates an electronic note with a partitioned unit positioned the closest to the electronic note in a page with the electronic note, for example. The correlating section 11D also extracts a keyword in accordance with the condition determined in advance and discussed above from the partitioned unit with which the electronic note is correlated. In extracting a keyword, in the case where the note-attached target data are image data, character recognition is performed to recognize character data. Meanwhile, chapters, sections, and paragraphs as partitioned units are determined by analyzing the format of the target data. Specifically, chapters and sections may be determined by determining a symbol that represents a chapter or a section, a font size that represents a chapter or a section, a number that represents a chapter or a section, etc., for example. Paragraphs may be determined by determining indentation etc., for example. The correlating section 11D registers the correlated location, a note character string, a degree of priority, and the keyword in the note management table 15B illustrated in FIG. 3 and discussed above as correlated with the identification number of the electronic note.

The extraction section 11E according to the present exemplary embodiment extracts a page with an electronic note and associated pages associated with the page with the electronic note from the note-attached target data which are stored in the storage section 15. Specifically, the extraction section 11E references the note management table 15B illustrated in FIG. 3 and discussed above on the basis of an extraction condition designated via a reception screen to be discussed later, and extracts a page with an electronic note and associated pages from the note-attached target data. The extraction section 11E may extract the page with the electronic note and the associated pages as a print target or as a preview display target.

In extracting associated pages, the display control section 11B performs control so as to display a reception screen for receiving designation of a condition for extracting associated pages on the display section 16. The reception screen may receive selection of an attribute set in advance to an electronic note. In this case, in the case where a plurality of electronic notes are attached, the extraction section 11E extracts an electronic note that matches the attribute which is selected on the reception screen from the plurality of electronic notes.

The output section 11F according to the present exemplary embodiment outputs the page with the electronic note and the associated pages which are extracted by the extraction section 11E to the printer 30 or the display section 16. In the case where the page with the electronic note and the associated pages are output to the printer 30, such pages are acquired as a printed matter. In the case where the page with the electronic note and the associated pages are output to the display section 16, such pages are displayed for preview.

Next, a method of extracting a page with an electronic note will be specifically described with reference to FIGS. 4 to 6.

Figure 4:
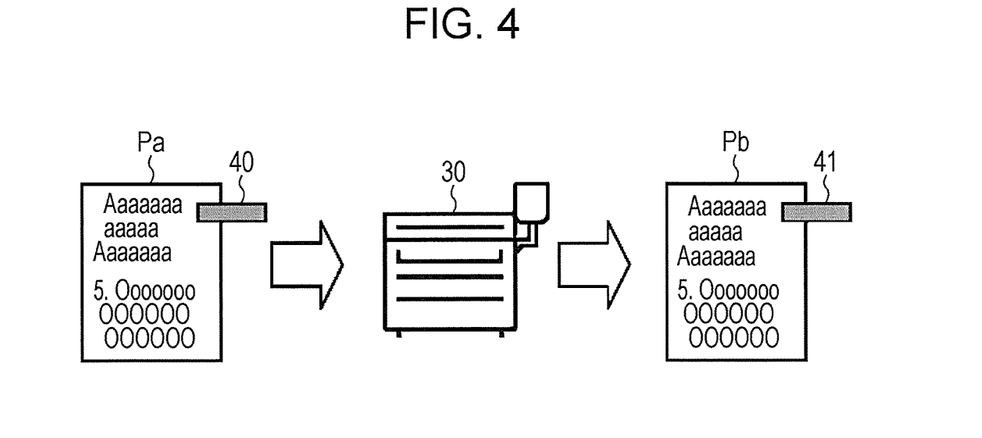
FIG. 4 illustrates a page extraction method according to a comparative example.

FIG. 4 illustrates a page extraction method according to a comparative example.

In the comparative example in FIG. 4, an electronic note 40 is attached to an electronic page Pa. In the case of this comparative example, only the electronic page Pa with the electronic note 40 is extracted as a print target. Therefore, when the electronic page Pa with the electronic note 40 is output by the printer 30, the printed result will only include a printed page Pb corresponding to the electronic page Pa. The printed page Pb has a note 41 printed in correspondence with the electronic note 40.

Figure 5:
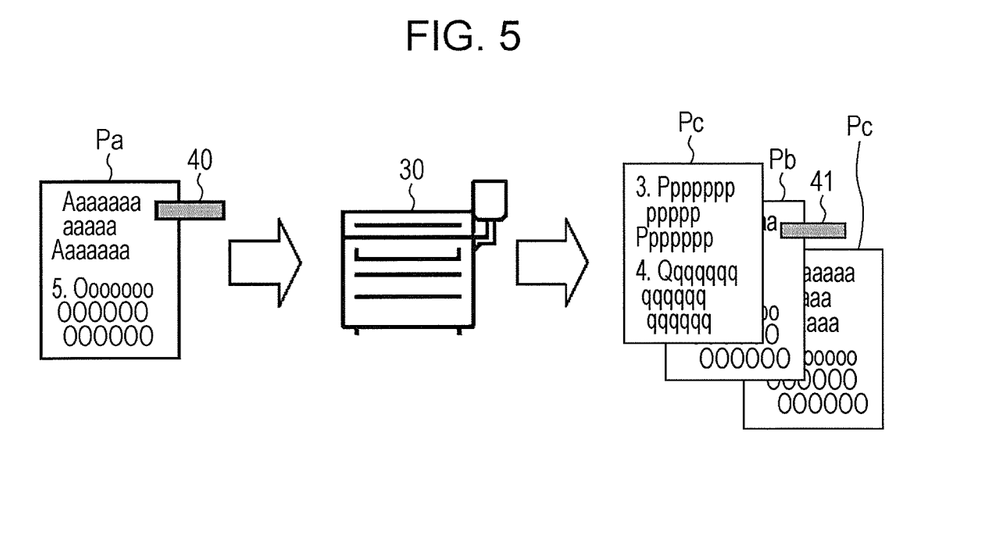
FIG. 5 illustrates a page extraction method according to the exemplary embodiment.

FIG. 5 illustrates a page extraction method according to the present exemplary embodiment.

In the example in FIG. 5, an electronic note 40 is attached to an electronic page Pa. In the case of the present exemplary embodiment, the extraction section 11E extracts one or more pages before and/or after the electronic page Pa as associated pages. The number of pages to be extracted as the one or more pages before and/or after the electronic page Pa is designated in advance. The electronic page Pa is identified using the note management table 15B illustrated in FIG. 3 and discussed above. When the electronic page Pa with the electronic note 40 is output by the printer 30, the printed result will be a printed page Pb corresponding to the electronic page Pa and printed pages Pc corresponding to the associated pages. The print page Pb has a note 41 printed in correspondence with the electronic note 40.

Figure 6:
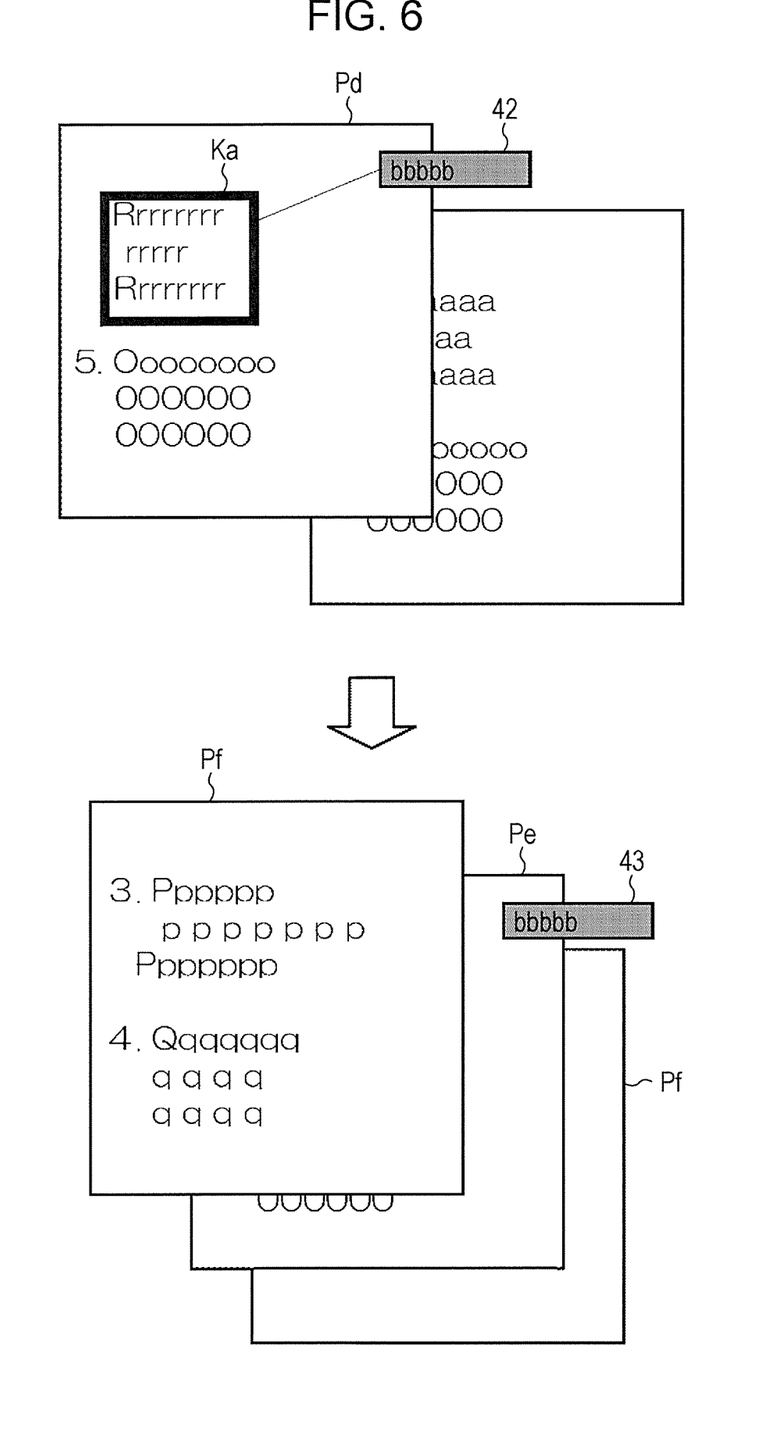
FIG. 6 illustrates another page extraction method according to the exemplary embodiment.

FIG. 6 illustrates another page extraction method according to the present exemplary embodiment.

In the example in FIG. 6, the electronic page Pd has an electronic note 42 with a character string ("bbbbb" in the example in FIG. 6). The electronic note 42 is correlated with a partitioned unit Ka of the electronic page Pd. The extraction section 11E identifies the partitioned unit Ka as being correlated with the electronic note 42 using the note management table 15B illustrated in FIG. 3 and discussed above, and extracts electronic pages including the partitioned unit Ka as associated pages. In the case where the partitioned unit Ka is a chapter, for example, all the electronic pages of the chapter are extracted as associated pages. In the case where the partitioned unit Ka is a section, for example, all the electronic pages of the section are extracted as associated pages. In the case where the partitioned unit Ka is a paragraph, for example, all the electronic pages that contain at least a portion of the paragraph are extracted as associated pages.

The extraction section 11E may search the note-attached target data using a character string in the partitioned unit Ka as a keyword, and extract electronic pages containing the character string as associated pages. The keyword is identified using the note management table 15B illustrated in FIG. 3 and discussed above. When the electronic page Pd with the electronic note 42 is output by the printer 30 (not illustrated), the printed result will include not only a printed page Pe corresponding to the electronic page Pd but also printed pages Pf corresponding to the associated electronic pages. The printed page Pe has a note 43 printed in correspondence with the electronic note 42. In one embodiment, the character string ("bbbbb" in the example in FIG. 6) on the electronic note 42 may be used as a keyword of a search to find associated pages.

In the comparative example in FIG. 4, only the electronic page Pa with the electronic note 40 is printed, and associated pages associated with the electronic page Pa with the electronic note 40 are not printed. In this case, in order to check the content of the associated pages, the user need to separately print the associated pages, which is cumbersome.

In the exemplary embodiment in FIGS. 5 and 6, on the contrary, the electronic page Pa with the electronic note 40 and its associated pages are printed at once.

Next, the function of the information processing apparatus 10 according to the present exemplary embodiment will be described with reference to FIG. 7.

Figure 7:
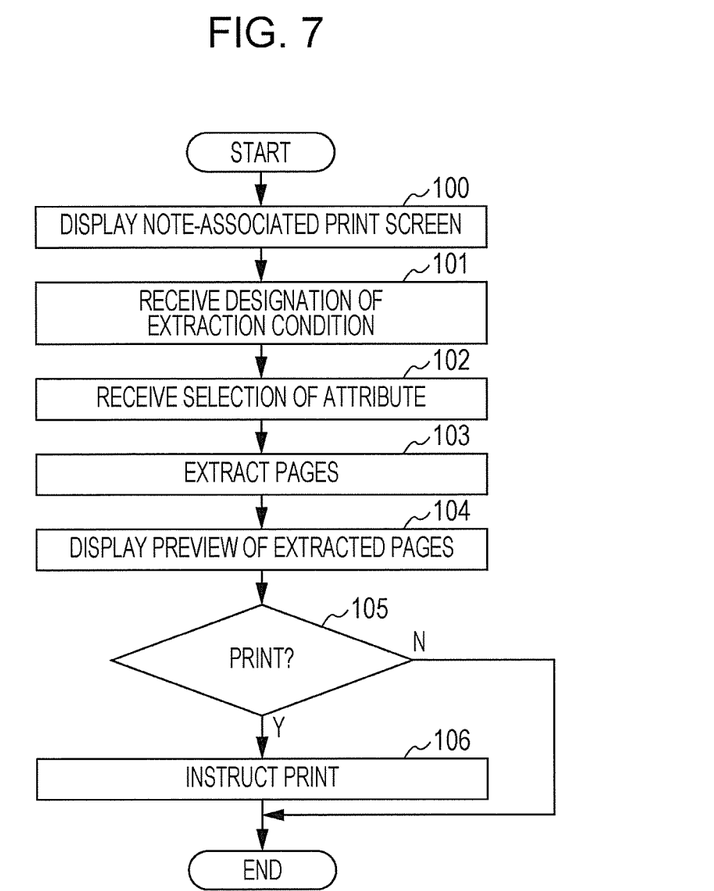
FIG. 7 is a flowchart illustrating an example of the flow of a process of an information processing program according to the exemplary embodiment.

FIG. 7 is a flowchart illustrating an example of the flow of a process of the information processing program 15A according to the present exemplary embodiment.

First, when the information processing apparatus 10 is instructed by the user to start a note-associated print process, the information processing program 15A is started to execute the following steps.

Figure 8:
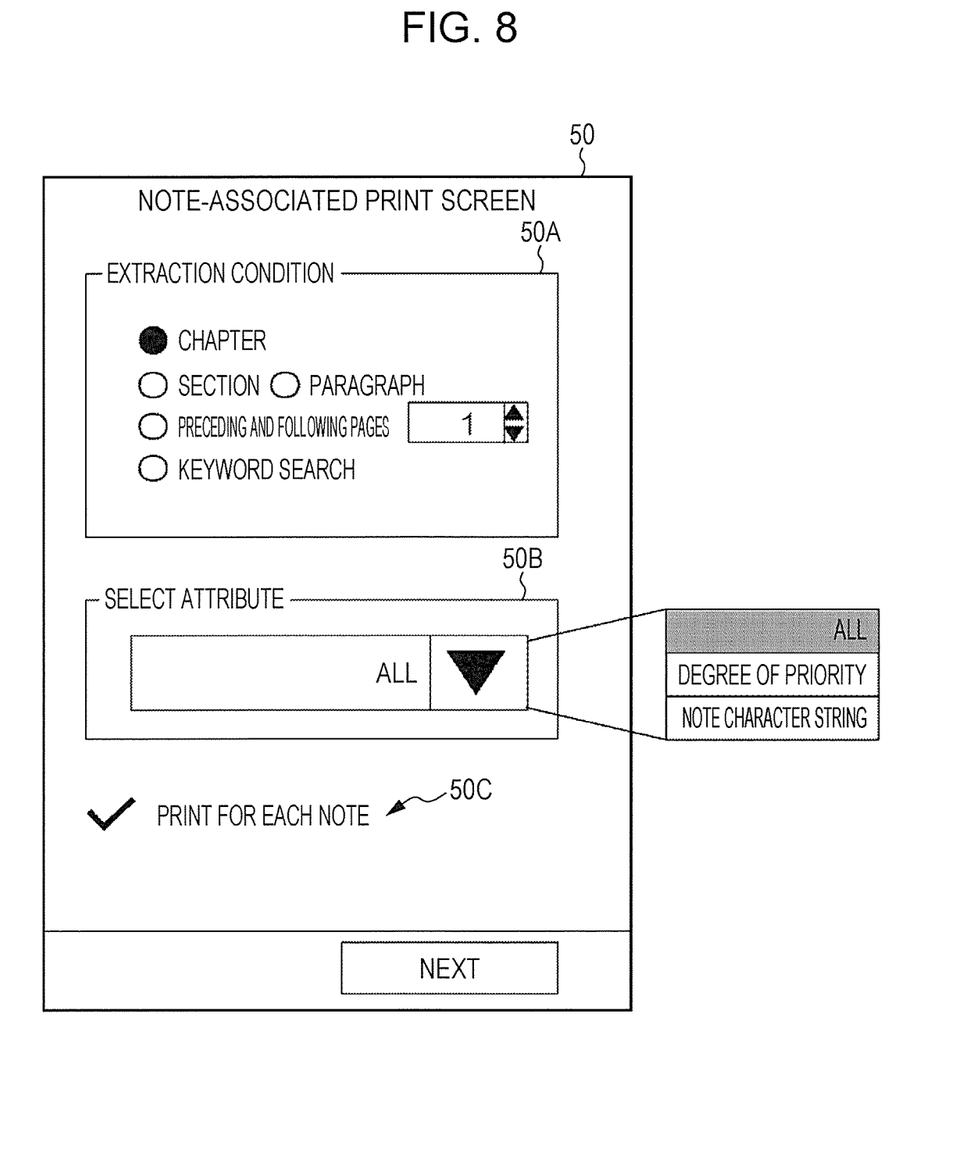
FIG. 8 is a front view illustrating an example of a note-associated print screen according to the exemplary embodiment.

In step S100 in FIG. 7, the CPU 11 performs control so as to display a note-associated print screen 50 illustrated in FIG. 8 on the display section 16, by way of example.

FIG. 8 is a front view illustrating an example of the note-associated print screen 50 according to the exemplary embodiment.

The note-associated print screen 50 illustrated in FIG. 8 is an example of the reception screen discussed above. The note-associated print screen 50 includes an extraction condition designation field 50A, an attribute select field 50B, and a note print check field 50C.

The extraction condition designation field 50A allows designation of "chapter", "section", "paragraph", "preceding and following pages", and "keyword search" as an extraction condition. For example, in the case where "chapter" is designated, all the pages including at least a portion of the chapter are extracted as associated pages. For example, in the case where "section" is designated, all the pages including at least a portion of the section are extracted. For example, in the case where "paragraph" is designated, all the pages that includes at least a portion of the paragraph are extracted. In the case where "preceding and following pages" is designated, a designated number of pages before and after a page with an electronic note are extracted. The designated number of pages may be N (N≥1) pages before and after a page with an electronic note. In the case where "keyword search" is designated, pages that have the keyword which is extracted from a partitioned unit (e.g. a chapter, a section, or a paragraph) with which an electronic note is correlated are extracted. Pages associated with the content of a partitioned unit with which an electronic note is correlated may be extracted. Associated pages are extracted using machine learning etc., for example.

The attribute select field 50B allows selection of "all", "degree of priority", and "note character string" as an attribute set in advance to an electronic note. If "all" is selected, all attributes are selected. In this example, when the black inverted triangular button is operated, a list box is displayed to allow selection of "all", "degree of priority", and "note character string". In the case where an attribute is not selected from the list box, the attribute select field 50B is left blank.

The note print check field 50C allows designation as to whether or not to permit duplicate print of associated pages for each note by giving and not giving a check mark. In the case where a check mark is given, duplicate print is permitted, and pages that match the extraction condition are printed for each note. In the case where a check mark is not given, on the other hand, duplicate print is prohibited, and control is performed such that pages that match the extraction condition are not printed in duplicate for each note.

Figure 9:
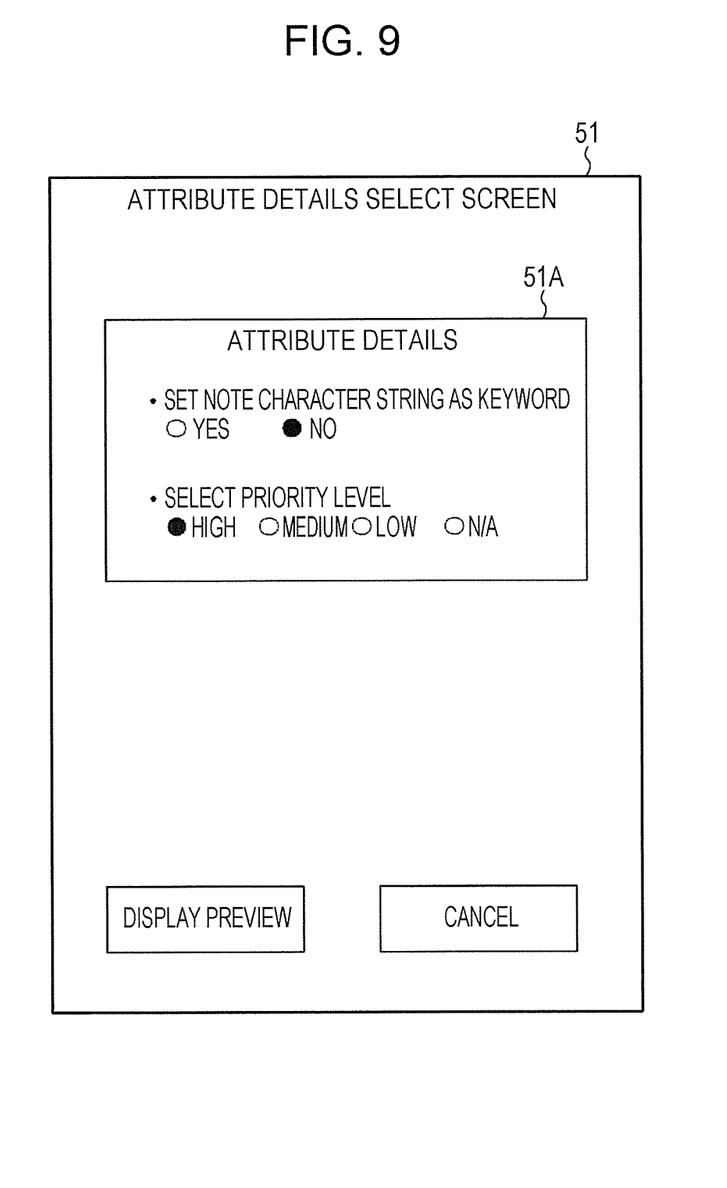
FIG. 9 is a front view illustrating an example of an attribute details select screen according to the exemplary embodiment.

When the "next" button is operated on the note-associated print screen 50 illustrated in FIG. 8, an attribute details select screen 51 illustrated in FIG. 9 is displayed on the display section 16, by way of example.

FIG. 9 is a front view illustrating an example of the attribute details select screen 51 according to the exemplary embodiment.

The attribute details select screen 51 illustrated in FIG. 9 includes an attribute details select field 51A. The attribute details select field 51A includes "set note character string as keyword" and "select level of priority". "Set note character string as keyword" allows selection as to whether or not to set the note character string ("bbbbb" in the example in FIG. 6) as a keyword. "Select level of priority" allows selection of the level of priority (high, medium, low, or NA).

In step S101, the CPU 11 receives designation of an extraction condition from the user via the note-associated print screen 50 illustrated in FIG. 8 and discussed above, by way of example.

In step S102, the CPU 11 receives selection of an attribute from the user via the note-associated print screen 50 illustrated in FIG. 8 and the attribute details select screen 51 illustrated in FIG. 9 and discussed above, by way of example.

In step S103, when the "display preview" button is operated on the attribute details select screen 51 illustrated in FIG. 9 and discussed above, by way of example, the CPU 11 references the note management table 15B illustrated in FIG. 3 and discussed above on the basis of the extraction condition which is designated in step S101 and the attribute which is selected in step S102, and extracts a page with an electronic note and associated pages from the note-attached target data. In the case where a plurality of electronic notes are attached, as discussed above, an electronic note that matches the attribute (e.g. "high" degree of priority) which is selected on the attribute details select screen 51 is extracted from the plurality of electronic notes from the note management table 15B. In the case where a note character string is selected as the attribute, electronic notes that have the same note character string may be extracted, for example.

In step S104, the CPU 11 performs control so as to display preview of the page with the electronic note and the associated pages which are extracted in step S103 on the display section 16. A note-associated print preview screen 52 illustrated in FIG. 10 is displayed as an example of the preview display.

Figure 10:
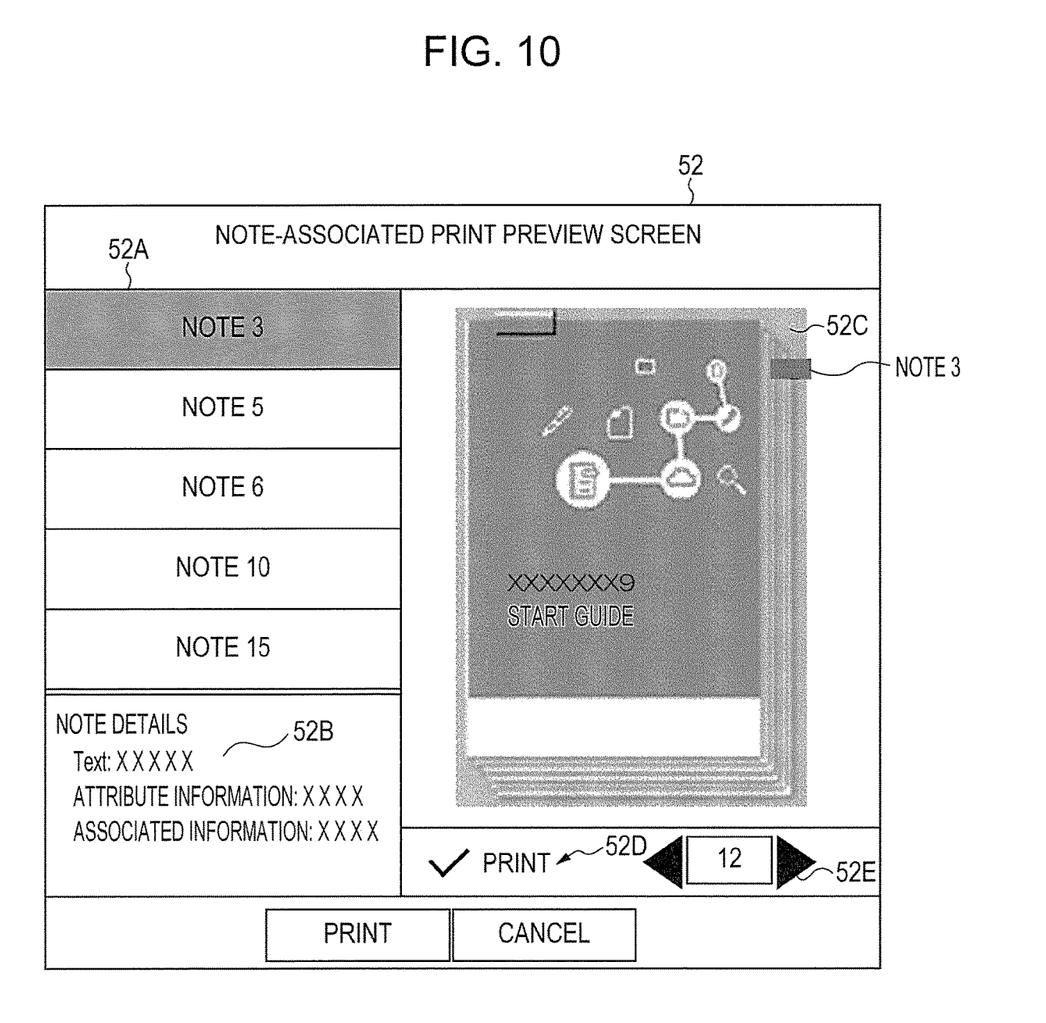
FIG. 10 is a front view illustrating an example of a note-associated print preview screen according to the exemplary embodiment.

FIG. 10 is a front view illustrating an example of the note-associated print preview screen 52 according to the exemplary embodiment.

The note-associated print preview screen 52 illustrated in FIG. 10 includes a print target note list 52A, note details 52B, page preview display 52C, print designation 52D, and page turn 52E.

The print target note list 52A displays a list of electronic notes extracted as print targets. For example, in the case where the "high" degree of priority is selected on the attribute details select screen 51 illustrated in FIG. 9 and discussed above, electronic notes that match the "high" degree of priority are extracted. The note details 52B display information related to an electronic note ("note 3" in the example in FIG. 10) selected in the print target note list 52A. The page preview display 52C displays preview of the page with the electronic note (note 3) which is selected in the print target note list 52A and the associated pages as print targets. The print designation 52D is used to designate whether or not to print the pages which are displayed in the page preview display 52C. In the case where a check mark is given, the displayed pages are printed. In the case where a check mark is not given, the displayed pages are not printed. The page turn 52E allows movement among a plurality of pages in the case where there are a plurality of print target pages.

In step S105, the CPU 11 determines whether or not the "print" button on the note-associated print preview screen 52 illustrated in FIG. 10 and discussed above is operated, by way of example. In the case where it is determined that the "print" button is operated (in the case of a positive determination), the process proceeds to step S106. In the case where it is determined that the "print" button is not operated, that is, the "cancel" button is operated (in the case of a negative determination), the sequence of processes of the present information processing program 15A is ended.

In step S106, the CPU 11 instructs the printer 30 to print the print target pages in accordance with the operation of the "print" button in step S105, and ends the sequence of processes of the present information processing program 15A.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The information processing apparatus according to the exemplary embodiment has been described above. The exemplary embodiment may be implemented in the form of a program that causes a computer to execute the functions of the various sections of the information processing apparatus. The exemplary embodiment may be implemented in the form of a computer-readable storage medium that stores such a program.

Besides, the configuration of the information processing apparatus described in relation to the above exemplary embodiment is exemplary, and may be changed in accordance with the situation without departing from the scope and spirit of the present disclosure.

The flow of the process of the program described in relation to the above exemplary embodiment is also exemplary, and an unnecessary step may be removed, a new step may be added, or the process order may be changed without departing from the scope and spirit of the present disclosure.

In the exemplary embodiment described above, the process according to the exemplary embodiment is implemented by a software configuration using a computer by executing a program. However, the present disclosure is not limited thereto. For example, the process according to the exemplary embodiment may be implemented by a hardware configuration or a combination of a hardware configuration and a software configuration.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a communication interface that communicates with a printer;
a processor configured to extract, as a print target, an annotated page and one or more associated pages associated with the annotated page from target data including a plurality of pages, and output the annotated page and the one or more associated pages to the printer for printing.

2. The information processing apparatus according to claim 1, wherein the processor is configured to
extract, as the one or more associated pages, a designated number of pages immediately before and/or immediately after the annotated page.

3. The information processing apparatus according to claim 1, wherein the processor is configured to
identify a partitioned unit related to an annotation of the annotated page, and
extract, as the one or more associated pages, a page that includes the identified partitioned unit.

4. The information processing apparatus according to claim 1, wherein the processor is configured to
search the target data for a character string in a partitioned unit related to an annotation of the annotated page, and
extract, as the one or more associated pages, a page containing the character string in the partitioned unit.

5. The information processing apparatus according to claim 4,
wherein the annotation includes a character string,
wherein the processor is configured to
search the target document for the character string of the annotation, and
extract, as the one or more associated pages, a page containing the character string of the annotation.

6. The information processing apparatus according to claim 3, wherein the processor is configured to
identify a partitioned unit closest to the annotation as the partitioned unit related to the annotation.

7. The information processing apparatus according to claim 4, wherein the processor is configured to
identify a partitioned unit closest to the annotation as the partitioned unit related to the annotation.

8. The information processing apparatus according to claim 5, wherein the processor is configured to
identify a partitioned unit closest to the annotation as the partitioned unit related to the annotation.

9. The information processing apparatus according to claim 3,
wherein the partitioned unit is a chapter, a section, or a paragraph in the target data.

10. The information processing apparatus according to claim 4, wherein the partitioned unit is a chapter, a section, or a paragraph in the target data.

11. The information processing apparatus according to claim 5,
wherein the partitioned unit is a chapter, a section, or a paragraph in the target data.

12. The information processing apparatus according to claim 6,
wherein the partitioned unit is a chapter, a section, or a paragraph in the target data.

13. The information processing apparatus according to claim 7,
wherein the partitioned unit is a chapter, a section, or a paragraph in the target data.

14. The information processing apparatus according to claim 8,
wherein the partitioned unit is a chapter, a section, or a paragraph in the target data.

15. The information processing apparatus according to claim 1, wherein the processor is configured to
perform control so as to display a reception screen that receive designation of a condition, and
extract the one or more associated pages based on the designated condition.

16. The information processing apparatus according to claim 2, wherein the processor is configured to
perform control so as to display a reception screen that receive designation of a condition, and
extract the one or more associated pages based on the designated condition.

17. The information processing apparatus according to claim 3, wherein the processor is configured to
perform control so as to display a reception screen that receive designation of a condition, and
extract the one or more associated pages based on the designated condition.

18. The information processing apparatus according to claim 15,
wherein the reception screen receives selection of an annotation attribute from among a plurality of annotation attributes,
wherein the one or more associated pages is extracted based on the designated condition and the selected annotation attribute.

19. The information processing apparatus according to claim 18, wherein the processor is configured to
extract a page including an annotation with the selected annotation attribute as the one or more associated pages.

20. A non-transitory computer readable medium storing a program causing a computer to execute a process comprising:
extracting, as a print target, an annotated page and one or more associated pages associated with the annotated page from target data including a plurality of pages; and
outputting the annotated page and the one or more associated pages to a printer for printing.

* * * * *